US011202036B2

(12) United States Patent
Yerli

(10) Patent No.: US 11,202,036 B2
(45) Date of Patent: Dec. 14, 2021

(54) MERGED REALITY SYSTEM AND METHOD

(71) Applicant: THE CALANY HOLDING S, À R.L., Luxembourg (LU)

(72) Inventor: Cevat Yerli, Frankfurt am Main (DE)

(73) Assignee: THE CALANY Holding S. À R.L., Luxembourg (LU)

(*) Notice: Subject to any disclaimer, the term of this patent is extended or adjusted under 35 U.S.C. 154(b) by 0 days.

(21) Appl. No.: 16/903,227

(22) Filed: Jun. 16, 2020

(65) Prior Publication Data
US 2020/0402293 A1    Dec. 24, 2020

Related U.S. Application Data

(60) Provisional application No. 62/863,171, filed on Jun. 18, 2019.

(51) Int. Cl.
*G06T 19/00* (2011.01)
*H04N 7/15* (2006.01)
(Continued)

(52) U.S. Cl.
CPC ............. *H04N 7/157* (2013.01); *G06F 9/453* (2018.02); *G06F 16/2379* (2019.01);
(Continued)

(58) Field of Classification Search
None
See application file for complete search history.

(56) References Cited

U.S. PATENT DOCUMENTS 5,883,817 A    3/1999    Chisholm
5,956,039 A    9/1999    Woods et al.
(Continued)

FOREIGN PATENT DOCUMENTS

CN    100484726 C    5/2009
CN    102120325 B    12/2012
(Continued)

OTHER PUBLICATIONS

Klas et al., "VR is on the Edge: How to Deliver 360 Videos in Mobile Networks", ACM, 2017. (Year: 2017).*
(Continued)

*Primary Examiner* — Nicholas R Wilson
(74) *Attorney, Agent, or Firm* — Christensen O'Connor Johnson Kindness PLLC

(57) ABSTRACT

A merged reality system comprises servers in a cloud to edge infrastructure configured to store and process data and models of virtual replicas of real world elements that provide self-computing capabilities and autonomous behavior to the virtual replicas. The data and models are input through a plurality of software platforms, software engines, and sensors connected to things and user devices. The server is further configured to merge the real and virtual data and models in order to augment the real data with the virtual data. A method thereof comprises mapping the real world into a virtual world, generating virtual replicas of the real world; adding models and data of the virtual replicas; connecting the virtual replicas to corresponding real elements in order to enrich and synchronize the virtual replicas with the real-world elements; merging the real and virtual data; and augmenting the real data with the virtual data.

20 Claims, 12 Drawing Sheets

(51) Int. Cl.
| | | |
|---|---|---|
| *H04L 29/06* | (2006.01) | |
| *G06T 7/70* | (2017.01) | |
| *G06F 9/451* | (2018.01) | |
| *G06F 16/23* | (2019.01) | |
| *G06N 20/00* | (2019.01) | |
| *G06F 16/9535* | (2019.01) | |
| *H04L 29/08* | (2006.01) | |
| *G06T 15/20* | (2011.01) | |
| *G06T 17/00* | (2006.01) | |
| *G06T 17/10* | (2006.01) | |
| *G06Q 20/12* | (2012.01) | |

(52) U.S. Cl.
CPC ......... *G06F 16/9535* (2019.01); *G06N 20/00* (2019.01); *G06T 7/70* (2017.01); *G06T 15/205* (2013.01); *G06T 17/005* (2013.01); *G06T 17/10* (2013.01); *G06T 19/006* (2013.01); *H04L 65/4069* (2013.01); *H04L 65/4076* (2013.01); *H04L 67/10* (2013.01); *G06Q 20/123* (2013.01); *G06T 2219/024* (2013.01)

(56) References Cited

U.S. PATENT DOCUMENTS

| | | |
|---|---|---|
| 6,278,479 B1 | 8/2001 | Wilson et al. |
| 6,556,206 B1 | 4/2003 | Benson et al. |
| 7,168,051 B2 | 1/2007 | Robinson et al. |
| 7,529,690 B2 | 5/2009 | Hadi |
| 8,326,704 B2 | 12/2012 | Glazer et al. |
| 8,564,621 B2 | 10/2013 | Branson |
| 9,281,727 B1 | 3/2016 | Coley et al. |
| 9,511,291 B2 | 12/2016 | Lyons et al. |
| 9,669,321 B2 | 6/2017 | Reveley |
| 9,704,298 B2 | 7/2017 | Espeset et al. |
| 9,721,386 B1 | 8/2017 | Worley, III et al. |
| 10,565,764 B2 | 2/2020 | Han et al. |
| 2002/0116235 A1 | 8/2002 | Grimm et al. |
| 2002/0191017 A1 | 12/2002 | Sinclair et al. |
| 2003/0030658 A1 | 2/2003 | Gibbs et al. |
| 2006/0122917 A1 | 6/2006 | Lokuge et al. |
| 2006/0184886 A1 | 8/2006 | Chung et al. |
| 2007/0168463 A1 | 7/2007 | Rothschild |
| 2008/0263460 A1 | 10/2008 | Altberg et al. |
| 2009/0055019 A1 | 2/2009 | Stiehl et al. |
| 2009/0244059 A1 | 10/2009 | Kulkarni et al. |
| 2009/0326713 A1 | 12/2009 | Moriya |
| 2010/0131865 A1 | 5/2010 | Ackley et al. |
| 2010/0131947 A1 | 5/2010 | Ackley et al. |
| 2011/0060425 A1 | 3/2011 | Freed |
| 2012/0038667 A1 | 2/2012 | Branson et al. |
| 2012/0133638 A1 | 3/2012 | Davison et al. |
| 2012/0105475 A1 | 5/2012 | Tseng |
| 2012/0149349 A1 | 6/2012 | Quade |
| 2013/0009994 A1 | 1/2013 | Hill |
| 2013/0044106 A1 | 2/2013 | Shuster et al. |
| 2013/0117377 A1 | 5/2013 | Miller |
| 2013/0179576 A1 | 7/2013 | Boldyrev et al. |
| 2014/0063061 A1 | 3/2014 | Reitan |
| 2014/0214504 A1 | 7/2014 | Young et al. |
| 2014/0221090 A1 | 8/2014 | Mutschler et al. |
| 2014/0282220 A1 | 9/2014 | Wantland et al. |
| 2015/0188984 A1 | 7/2015 | Mullins |
| 2016/0300392 A1 | 10/2016 | Jonczyk et al. |
| 2016/0343168 A1 | 11/2016 | Mullins et al. |
| 2016/0379415 A1 | 12/2016 | Espeset et al. |
| 2017/0092223 A1 | 3/2017 | Fain et al. |
| 2017/0203438 A1 | 7/2017 | Guerin et al. |
| 2017/0243403 A1 | 8/2017 | Daniels et al. |
| 2017/0250930 A1 | 8/2017 | Ben-Itzhak |
| 2017/0286572 A1 | 10/2017 | Hershey et al. |
| 2017/0287496 A1 | 10/2017 | Heitkamp et al. |
| 2017/0289202 A1 | 10/2017 | Krasadakis |
| 2017/0358024 A1 | 12/2017 | Mattingly et al. |
| 2018/0040038 A1 | 2/2018 | Vanslette et al. |
| 2018/0047093 A1 | 2/2018 | High et al. |
| 2018/0060948 A1 | 3/2018 | Mattingly et al. |
| 2018/0089903 A1 | 3/2018 | Pang |
| 2018/0173309 A1 | 6/2018 | Uchiyama et al. |
| 2018/0210436 A1 | 7/2018 | Burd et al. |
| 2018/0231973 A1 | 8/2018 | Mattingly et al. |
| 2018/0281193 A1 | 10/2018 | Favis |
| 2018/0342106 A1 | 11/2018 | Rosado |
| 2018/0349108 A1 | 12/2018 | Brebner |
| 2019/0065028 A1 | 2/2019 | Chashchin-Semenov et al. |
| 2019/0102494 A1 | 4/2019 | Mars |
| 2019/0102709 A1 | 4/2019 | Correa |
| 2019/0221036 A1 | 7/2019 | Griffin et al. |
| 2019/0361589 A1 | 11/2019 | Yerli |
| 2019/0361797 A1 | 11/2019 | Yerli |
| 2020/0175759 A1* | 6/2020 | Russell ................. G06F 3/017 |
| 2020/0209949 A1 | 7/2020 | Noris et al. |
| 2020/0210137 A1 | 7/2020 | Noris et al. |
| 2020/0211251 A1 | 7/2020 | Noris et al. |
| 2020/0349735 A1* | 11/2020 | Dine ..................... G06T 7/74 |

FOREIGN PATENT DOCUMENTS

| | | |
|---|---|---|
| DE | 101 28 015 A1 | 12/2001 |
| DE | 10 2005 011 126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 1020180020725 A | 4/2019 |
| WO | 2002/063454 A1 | 8/2002 |
| WO | 2008/065458 A2 | 6/2008 |
| WO | 2008/065458 A3 | 6/2008 |
| WO | 2009/029559 A1 | 3/2009 |
| WO | 2013/050473 A1 | 4/2013 |
| WO | 2016/017254 A1 | 2/2016 |
| WO | 2016/077493 A1 | 5/2016 |
| WO | 2016/164178 A1 | 10/2016 |
| WO | 2017/141391 A1 | 8/2017 |
| WO | 2018/074000 A1 | 4/2018 |
| WO | 2019/079826 A1 | 4/2019 |

OTHER PUBLICATIONS

Foley et al., "KD-Tree Acceleration Structures for a GPU Raytracer", ACM, 2005. (Year: 2005).*
DiVerdi et al., "Level of Detail Interfaces", IEEE, 2004. (Year: 2004).*
European Search Report dated Nov. 18, 2020, issued in European Application No. 20180856.5, 12 pages.
European Search Report dated Nov. 17, 2020, issued in European Application No. 20180736.9, 13 pages.
European Search Report dated Oct. 27, 2020, issued in European Application No. 20180712.0, 11 pages.
Extended European Search Report dated Nov. 16, 2020, issued in European Application No. 20180885.4, 12 pages.
Extended European Search Report dated Nov. 18, 2020, issued in European Application No. 20180739.3, 12 pages.
Extended European Search Report dated Nov. 18, 2020, issued in European Application No. 20180723.7, 12 pages.
Extended European Search Report dated Nov. 19, 2020, issued in European Application No. 20180869.8, 9 pages.
Office Action dated Jan. 11, 2021, issued in U.S. Appl. No. 16/903,239, filed Jun. 16, 2020, 28 pages.
Office Action dated Jan. 11, 2021, issued in U.S. Appl. No. 16/903,235, filed Jun. 16, 2020, 26 pages.
Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube.com/watch?v=CVmfP8 TaqNU [retrieved on Oct. 30, 2020].
Yang, X., et al., "Virtual Reality Tools for Internet-Based Robotic Teleoperation", Proceedings of the Eighth IEEE International Symposium on Distributed and Real-Time Applications, 2004, 5 pages.

(56) References Cited

OTHER PUBLICATIONS

Asanuma, K., et al., "User Interface for Remote Operation of a Moving Robot via Internet", 9 pages.
Office Action issued in Japanese Application No. 2019096678, 3 pages.
Office Action dated Feb. 17, 2021, issued in U.S. Appl. No. 16/904,213, filed Jun. 16, 2020, 18 pages.
Extended European Search Report dated Oct. 17, 2019, issued in European Application No. 19176426.5, filed May 24, 2019, 9 pages.
Korean Office Action dated May 26, 2020, issued in corresponding KR Application No. 10-2019-0060412, filed May 23, 2019, 13 pages.
Rajappa et al., "Application and Scope Analysis of Augmented Reality in Marketing using Image Processing Technique" (2016).
Office Action dated Aug. 6, 2020, in U.S. Appl. No. 16/421,155, filed May 23, 2019, 26 pages.
Office Action dated Feb. 12, 2021, in U.S. Appl. No. 16/421,155, filed May 23, 2019, 26 pages.
European Search Report dated Jan. 17, 2020, in European Application No. 19176436.4, filed May 24, 2019, 33 pages.
Massachusetts Institute of Technology, "Huggable", Jul. 17, 2013, <http://www.youtube.com/watch?v=Z-8_RhkdvoA> [retrieved Sep. 6, 2019], 2 pages.
Partial European Search Report dated Sep. 9, 2019, in European Application No. 19176436.4, filed May 24, 2019, 18 pages.
Alsamhi, S.H., et al., "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1-10.
Office Action dated Aug. 26, 2020, issued in U.S. Appl. No. 16/903,235, filed Jun. 16, 2020, 21 pages.
Office Action dated Aug. 24, 2020, issued in U.S. Appl. No. 16/903,239, filed Jun. 16, 2020, 19 pages.
Extended European Search Report dated Sep. 14, 2020, issued in European Application No. 20176245.7, 8 pages.
"Walmart Patent Wants You to Shop at Home Using Virtual Reality," Research Brief, Aug. 17, 2018, <https://www.cbinsights.com/research/walmart-virtual-reality-retail-patent/> [retrieved Jun. 5, 2020], 8 pages.
Office Action dated Nov. 19, 2020, issued in Japanese Application No. 2019096980, 42 pages.
Web+DB Press, vol. 32, May 25, 2006, ISBN 4-7741-2752-3, p. 10-17.
Micheal Lanham, "Unity AR" (Japanese version), Sep. 1, 2017, ISBN 978-4-87311-810-9, 26 pages.
Jeffrey Richter, "Windows Runtime" (Japanese version), Jun. 9, 2014, ISBN 978-4-8222-9831-9, pp. 291-300.
Yoshiyuki Hashimoto, "iOS iBeacon/GeoFence/Navi/CoreMotion/M7" (Japanese version) Mar. 1, 2014, ISBN 978-4-7980-4070-7, pp. 82-94.

\* cited by examiner

MERGED REALITY SYSTEM AND METHOD

CROSS-REFERENCE TO RELATED APPLICATION

This application claims the benefit of Provisional Application No. 62/863,171, filed Jun. 18, 2019, the entire disclosure of which is hereby incorporated by reference herein for all purposes.

FIELD

The present disclosure generally relates to computer systems, and more specifically to a system and method for generating and deploying virtual replicas of real-world elements.

BACKGROUND

A virtual world is a simulated environment providing a graphical and physical representation of either a real or imaginary world, where users can interact with each other or with other elements via avatars, or virtual replicas of each other. Virtual worlds are used, for example, to create video games, animation films or to train pilots in a flight simulator. In all these applications, programs are used to simulate virtual objects that interact, move, and change based on user-inputs or learned behaviors.

Objects in the virtual world may follow rules related to gravity, topography, physics and kinematics, which may or may not be based on real-world elements. As such, current techniques exist for creating a virtual replica of a real-world item. However, these virtual replicas often do not contain all or most of the data of the real-world element and the context around them, limiting the realism of the visual effects and types of interactions that the virtual replicas can have with users. Moreover, the replicas are typically not synchronized with their real-world counterpart to reflect changes made in the real-world. This limits the ability to employ the virtual world for significant applications such as management of the operations in buildings, factories, cities, etc. What is desired is a system and method to ease development, deployment, and operation of virtual replicas that can accurately mirror the real-world elements that they represent in a less computationally-intensive way, containing a high level of synchronized information from each element, and in an integrated ecosystem.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In the current disclosure, systems and methods to provide accurate and flexible merged reality are provided. The systems and methods may provide varying mixtures of reality that enable a totality of reality to be replaced by a persistent virtual world in virtual reality, or to have only some parts of reality to be replaced or expanded through virtual means, as in augmented or mixed reality. Augmentation techniques are typically performed in real-time and in semantic context with environmental elements, such as overlaying supplemental information or virtual objects (e.g., interactive applications in the form of animated interactive visual representations) in the real world. Real-world elements are replicated in virtual form to include a plurality of data that represent not just visual aspects of the elements but also physical and behavioral aspects, in addition to data used to synchronize the virtual and real elements. Mapping of the real elements into a persistent virtual world system comprises as well adding the real-world spatial data of the elements, which can be tracked through various methods. As all or most elements may be mapped and replicated in the virtual world, there may be no need to visually detect physical objects in the world, unless objects that are not included in the virtual world are detected. By virtualizing the real world, the systems and methods of the current disclosure further enable real-time interactions between real and virtual objects. In other embodiments, the merged reality system further enables machine to machine, human to machine, machine to human, and human to human interactions.

A merged reality system of the current disclosure comprises one or more servers configured to store and process input data, the one or more servers comprising a memory or storage including a data store with virtual replicas of real world elements and a processor configured to process data and instructions. The virtual replicas comprise virtual data and have self-computing capabilities and autonomous behavior. The system further comprises a plurality of connected devices communicating through a network and comprising sensing mechanisms configured to capture multi-source data from real-world elements. The real-world data is sent to the persistent virtual world system stored in the one or more servers in order to enrich said virtual replicas and synchronize the virtual replicas with corresponding real-world elements. Furthermore, the one or more servers merge the real-world data and the virtual data into the persistent virtual world system in order to augment the real-world data with the virtual data.

In some embodiments, the virtual replicas include logic, virtual data and/or models that may be input through a plurality of software platforms, software engines, and/or sensors connected to connected devices. In the current disclosure, logic refers to rules that define the operational instructions and behavior embedded in computer code, which may be required for the programming of virtual replicas or applications available in the persistent virtual world system. Virtual data are the attributes of the virtual replicas, and the models are the graphical, mathematical, and/or logic representations of any aspect of the corresponding real-world element, which may be defined and governed through the comprised logic. In embodiments of the current disclosure, the system may use a cloud to edge infrastructure that may implement distributed computing capabilities, comprising employing public or private clouds, distributed ledger-based infrastructure, cloudlets and edge systems, such as enterprise systems, mobile platforms, and user devices. The distributed ledger-based infrastructure may be a decentralized and immutable blockchain or distributed ledger network that facilitates the transfer and storage of data necessary to widely distribute the persistent virtual world system, including virtual replicas, applications, and any event or interaction within the persistent virtual world system. Through the cloud to edge infrastructure, resources including physical servers and network equipment enable a shared storage and computing that may allow for a dynamic allocation thereof depending on factors such as the distance of the user to the resources and the network and computational demand from the users relative to each other and to the locational positions they are, commanding more or less compute accordingly. In some embodiments, the dynamic allocation of storage and computing is codified into smart contracts using the distributed ledger infrastructure, automatizing the transactional logic (e.g., the computer logic behind each allocation of storage and computing) and the consequences or results of such allocation.

In some embodiments, the persistent virtual world system further comprises applications that users may interact with through user devices. The applications can be, for example, distributed applications using a distributed cloud to edge infrastructure of the current disclosure. The applications can assist in defining the type of interaction that users can have with the elements of the persistent virtual world system, such as enabling an interactive game-like mechanics with virtual replicas or avatars of other users in the persistent virtual world system. The applications can be available at an application library stored in the memory of the server or from external sources, such as through external application libraries connected to the server and providing applications to the persistent virtual world system.

In some embodiments, in order to reduce hardware and network demands, contribute to the reduction of network latency, and improve the general merged reality experience, the system may connect through a network including millimeter-wave (mmW) or combinations of mmW and sub 6 GHz communication systems, such as through $5^{th}$ generation wireless systems communication (5G). In other embodiments, the system may connect through wireless local area networking (Wi-Fi) providing data at 60 GHz. Provided communication systems may allow for low latency end-to-end (E2E) latency and high downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

The sensing mechanisms that may be installed on the plurality of connected devices may include one or more temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. By providing a plurality of connected devices with sensing mechanisms constantly capturing data from the real world, the virtual world and each of the synchronized virtual replicas are kept updated with real-time, multi-source data that mirror the conditions of the real world. In some embodiments, the multi-source data is processed through artificial intelligence algorithms that further provide the virtual replicas with autonomous behavior that can augment the real world. The artificial intelligence processing of the data may comprise performing data, image and object recognitions; data and object classification; data, image or object segmentations; data, image or object masking; data, image or object categorization; multi-dimensional trajectory generation of data and objects; or combinations thereof. The multi-source data includes capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

According to an embodiment, the sensing mechanisms mounted on the connected devices include a combination of inertial tracking sensing mechanisms and transceivers, wherein data tracked by such combination is available as embedded tracking data or tracking metadata to the sensed datasets. The inertial tracking sensing mechanisms can make use of devices such as accelerometers, gyroscopes, magnetometers, and others, which may be integrated in an inertial measuring unit (IMU), or may be separate from an IMU. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

Providing an accurate tracking of the connected elements may result useful for displaying a reliable status of virtual replicas within the persistent virtual world system, in particular their position and orientation, which may be relevant for various applications. In addition, enabling an accurate, real-time tracking of connected elements may reduce the need to physically sense other connected devices. However, certain sensing mechanisms, such as image-based sensors not limited to image, visible light, low-light, infrared, depth sensors, and time of flight sensors, may still result necessary to monitor, via the usage of computer vision, the real-time the status of non-connected elements or other entities that may or may not yet be stored in the persistent virtual world system, such as humans, animals, trees, or other elements. Moreover, it may be understood that the plurality of sensing mechanisms is still necessary to keep an updated status of the persistent virtual world system including multi-source data.

In a further embodiment, a bi-directional update i.e., an update from the persistent virtual world system to the real world, and from the real world to the persistent virtual world system, may occur and be registered via the use of smart contracts governing and interfacing the path to the storage. In such an embodiment, the storage database is a form of blockchain or distributed ledger-based data base.

In some embodiments, the multi-source data obtained from the real-world elements comprises real spatial data, while the data and models input by users comprise virtual spatial data. The real spatial data refers herein to instrumentation data captured physically through sensors. The virtual spatial data refers herein to data either input by users either manually, through existing computer models of the real-world elements (e.g., building information models), inferred by the system from other data, such as through simulations or using metadata, or data generated from interactions between the virtual replicas and the virtual world. Combinations of the multi-source data and the virtually-input spatial data enables augmenting the real spatial data with the virtual spatial data. For example, a scenario of a virtual city may comprise some real-world elements (e.g., dynamic real-world objects) whereupon tracking sensors have been installed or which are tracked by visual means, such as radar imaging, and others (e.g., static real-world objects) where the spatial data has been either manually input or has been inferred by the system. Thus, some real objects may comprise a realtime positional tracking that continuously or periodically provides real spatial data and a virtual sensing system that is interacting with the virtual world to generate additional spatial data that is fused with the real spatial data to get a full situational awareness to the object. This full situational awareness can be used, for example, to navigate through the streets and traffic of the city.

In some embodiments, the virtual spatial data of a virtual avatar represents a desired location input by a user via a user device wherein the desired location is different from the user's real location, prompting the processor of the servers to create a copy of the avatar in the desired location. In these embodiments, the user avatar may be viewed in the desired location by real users physically located in that location or by virtual users, being able to interact with one another via touching, hand movements, clicking or other similar gesture, voice, video capture or other expressions of user input through user devices and human-to-machine input translators. The user avatar may also interact with virtual objects in that location, including objects really located in that location, as all or most real objects have a virtual replica of their own, or with purely virtual objects that do not exist physically. The user avatar may also be viewed in his real location in augmented or virtual reality with, for example, an unavailable status, or may all over be invisible for other users in that location.

In some embodiments, the cloud server may store a virtual world layer that may be separated into an augmented reality layer and virtual reality layer. The separate layers may enable accessing, through the merged reality, the persistent virtual world system in any of augmented or virtual reality, and may be activated through user devices connected the at least one server whenever accessing one or the other type of reality. Each of the layers may comprise augmentations of reality and virtual replicas that may be specific to each layer. The layers may further comprise one or more applications, which may be available from one or more application libraries stored in the memory of the at least one cloud server, from external platforms, or through blockchains or distributed ledger-based distributed databases. The applications can be one or more traditional applications, distributed applications or decentralized applications.

In some embodiments, virtual replica nodes connected to each other create a virtual replica network. The virtual replica nodes may represent virtual replicas of the same or different types, and the virtual replica network may represent the connection and interactive relationship between the different virtual replicas. This way, two things can establish peer-to-peer (P2P) connections either through direct physical communications or through indirect virtual replica-based connections. The virtual replica networks of the merged reality system thus enable machine to machine, human to machine, machine to human, and human to human communication and interactions. The interaction mechanics are defined through the use of computer code included in computer scripts and computer programs, and may be enabled through applications, smart contracts, or combinations thereof provisioned in the persistent virtual world system where the interactions and interaction applications take place. The applications, smart contracts or combinations thereof thus enable digitally codifying and representing the possible and desired interactions and interaction interfaces between all elements of the real world through the persistent virtual world system. Interactions may be experienced by users in the form of interactive game-like applications or through game-like interaction mechanics, which can take place in the virtual world layer in any of the augmented reality layer or virtual reality layer. The interactions may be enabled, for example, during virtual visitations of physical locations through the virtual replica of the physical location, whereby users visiting such a location may virtually interact with elements configured in each of the virtual world layers.

A plurality of connected virtual replicas that may be used for goal-specific simulations may constitute a stream, wherein each stream is configured to obtain data from the corresponding virtual replicas and to perform goal-specific simulations. Each stream may connect to a root node or root simulation object that spawns a plurality of stream-related virtual replicas. The stream may additionally connect to an import function that defines the virtual replicas that the stream needs to know to perform the simulations. The import function may define which virtual replicas to consider for the traffic simulation. The stream may then read the behavior of each of the virtual replicas by using a combination of virtual and real sensors and to perform goal-specific simulations traffic scenarios. In some embodiments, a plurality of streams comprising the totality or majority of virtual replicas in a pre-determined environment, their context, and the relationships and interactions between each virtual replica forms a universe or sub-universe. For example a sub-universe for a city may be referred to as a city-verse, which may represent all of the buildings, trees, people, streets, traffic lights, vehicles, etc., of a city and their relationships, interactions and context. There may also be a sub-universe within another sub-universe, such as a house-verse within a city-verse. A house-verse may include the 3D design of the exterior and interior of the house, all the appliances, people, walls, energy consumption data, etc., of a house. A network of all sub-universes may form a universe of a persistent virtual world system that may be viewed in virtual or merged reality.

In some embodiments, suitable models comprise one or more of a 3D model, dynamic model, geometric model, or a machine learning model, or a combination thereof. The models and data may be input via a plurality of external platforms or engine services included in the persistent virtual world system. The plurality of external platforms may include, for example, an Internet of Things (IoT) platform, a machine learning (ML) platform, a big data platform or a simulation platform. External platforms may connect to the persistent virtual world system through application programming interfaces (APIs) and software development kits (SDKs), in order to provide and manipulate models and data of the virtual replicas. The engines services included in the persistent virtual world system may include artificial intelligence, simulation, 3D and haptic features, amongst others. The persistent virtual world system also connects to a spatial data streaming platform configured to receive and manage spatial data from the real-world elements and also from their virtual replicas. The system may further comprise digital reality interfaces, such as virtual reality, augmented reality, and merged reality interfaces to interact with the merged reality or virtual reality. These interaction interfaces and mechanics are defined through the use of computer code included in computer scripts and programs, and may be affected by applications (e.g., distributed applications) smart contracts, and the like, available in the persistent virtual world system where the interactions take place, digitally codifying possible and desired interactions between all elements of the real world and the virtual world, resulting in one view of the merged interactive reality.

The geometric model comprises the mathematical model defining the shape of the virtual replica based on the real-world element. The 3D model goes in hand with the geometric model to show data included in each of the geometries of the virtual replica, such as textures, colors, shading, reflection, lighting, collision effects. The 3D models comprise the 3D data structure that is used to visually represent the virtual replicas and other virtual elements in the persistent virtual world system, such as applications, ads, virtual bots, etc. The 3D data structure may include, for example, one or more octrees, quadtrees, BSP trees, sparse voxel octrees, 3D arrays, kD trees, point clouds, wireframes, boundary representations (B-Rep), constructive solid geometry trees (CSG Trees), bintrees, and hexagonal structures. The 3D data structure serves the function of accurately and efficiently representing the data of each of the geometries of the virtual objects in the persistent virtual world system. A correct selection of the 3D data structure depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the persistent virtual world system is employed, for example, a higher level of definition may be required for medical or scientific applications than for other types of applications; memory capacities from the servers and from the user devices and thus, desired memory consumption; and others.

The dynamic model represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real twin through the virtual twin. The machine learning model may employ machine learning algorithms that allow teaching a virtual replica about the behavior of a real twin in order to simulate the behavior of the real twin.

In some embodiments, the models used in the virtual replicas consider the level of detail (LOD) required by a specific scenario computation. LOD involves decreasing the complexity of a model representation as the virtual replica moves away from the viewer, or according to other metrics such as object importance, viewpoint-relative speed, or position. In some embodiments, LOD is further adjusted to individual viewers depending on a classification of the individual viewers comprising artificial intelligence viewers or a human viewers. In some embodiments, the LOD is further adjusted depending on a sub-classification of artificial intelligence viewer or of human viewer. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual replicas, from low to high fidelity models, enabling different simulations to be performed depending on the case and situation LOD management allows also to provide an optimized user experience, depending on the specific requirements and context.

According to an embodiment, a method to implement a merged reality system comprises mapping real-world objects of the real world into a virtual world, by generating virtual replicas of the real-world objects; adding models and real-world data related to the real-world objects to the virtual replicas; merging the real and virtual data; and augmenting the real data with the virtual data. In this way, the virtual replicas are connected to corresponding real-world elements in order to enrich and synchronize the virtual replicas with the real-world elements.

In some embodiments, the method further comprises obtaining real spatial data and virtual spatial data; checking whether the real and virtual spatial data coincide; in a negative case, where the real spatial data and virtual spatial data do not coincide, creating a copy of a user avatar in a desired location, the copy of the user avatar comprising the original data and models of the user avatar; in a positive case, where the real spatial data and virtual spatial data coincide, merging the real and virtual spatial data; and augmenting the real spatial data with the virtual spatial data.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
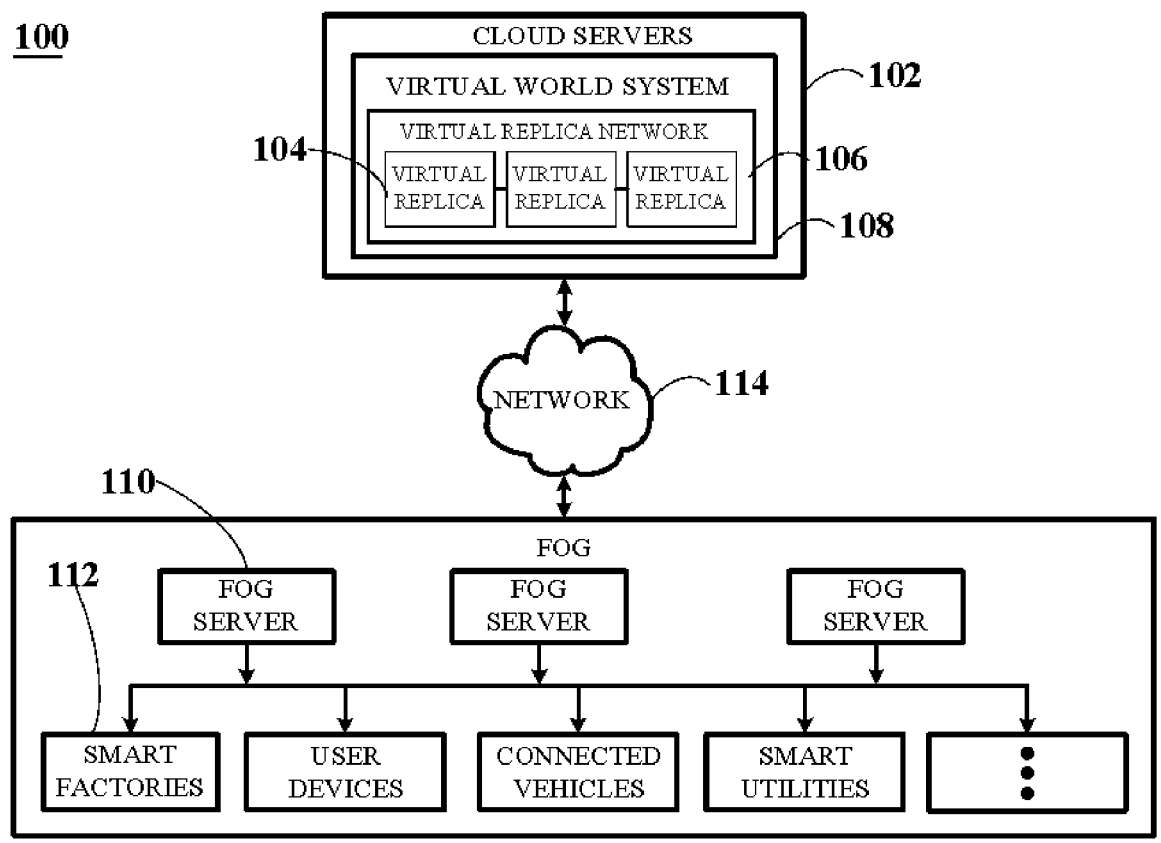
FIG. 1 depicts a diagram describing an infrastructure that may be used to implement a merged reality system, according to an embodiment.

FIG. 1 depicts a diagram describing an infrastructure 100 that may be used to implement a merged reality system, according to an embodiment.

A merged reality system infrastructure 100 of the current disclosure comprises one or more servers, such as cloud servers 102 configured to store and process input data, the one or more servers comprising a memory or storage (not shown) including a data store with virtual replicas 104 of real world elements, and a processor (not shown) configured to process data and instructions. A plurality of connected virtual replicas 104 forms a virtual replica network 106, which enables the establishment of peer-to-peer (P2P) connections either through direct physical communications or through indirect virtual replica based connections. A totality of virtual replica networks 106 in inter-connected areas of the world forms a persistent virtual world system 108, which may be accessed through suitable interfaces of devices by users.

In the current disclosure, the term "virtual replica" refers to accurate and persistent virtual representations of real-world elements. In an embodiment, the virtual replicas 104 of the current disclosure refer to a virtual version, or virtual twin, of a real-world element, or real twin, which may either be mapped or modeled through computer assisted drawing (CAD) or computer-assisted engineering (CAE) methods, input by computer models of the real objects (e.g., building information models—BIMs) or other suitable prior art methods, and which may mirror not just the appearance but also the behavior of the real twin. The real-world objects may additionally include sensors that can provide the virtual replicas 104 with multi-source input data for enriching and synchronizing the virtual replicas 104 with their respective real counterpart. Thus, virtual replicas 104 may obtain data from one or more sources (e.g., from one or more real-world objects, environmental sensors, computing devices, etc.). As used herein, the term "multi-source data" refers to data that may be obtained from multiple sources.

As explained above, virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on a plurality of devices, wherein the further real-world data comprises video data, temperature data, real-time energy consumption data, real-time water consumption data, speed or acceleration data, or the like.

For example, a specific traffic light in a city is linked to a road or street and can be associated also to other objects, such as sensors or other traffic signals. These relationships can trigger events that may create new interactions in the persistent virtual world system 108, for example, an emergency car in a street can automatically trigger a priority event that will change the traffic lights pattern to avoid any stops in the intersections based on the simulation of the trajectory of the emergency car and the actual traffic conditions in the area. Such conditions, events and consequences might be programmed as smart contracts bound to traffic-specific distributed ledger, e.g. a traffic sidechain with many smart contracts defining a variety of codified traffic rules and expect behaviors, hence automatizing and recording the occurrences of such events. The virtual replica networks 106 of the merged reality system enables machine to machine, human to machine, machine to human, and human to human communication and interactions. The interaction mechanics are defined through the use of computer code included in computer scripts and computer programs, and may be enabled through applications, smart contracts, or combinations thereof provisioned in the persistent virtual world system where the interactions and interaction applications take place. The applications, smart contracts or combinations thereof thus enable digitally codifying and representing the possible and desired interactions and interaction interfaces between all elements of the real world through the persistent virtual world system. Interactions may be experienced by users in the form of interactive game-like applications or through game-like interaction mechanics, which can take place in the virtual world layer in any of the augmented reality layer or virtual reality layer. The interactions may be enabled, for example, during virtual visitations of physical locations through the virtual replica of the physical location, whereby users visiting such a location may virtually interact with elements configured in each of the virtual world layers.

The systems of the current disclosure may use a cloud to edge infrastructure 100 that may implement distributed computing capabilities employing public or private cloud servers 102, fog servers 110, and systems 112, such as enterprise systems, mobile platforms, machinery, robots, vehicles, sensors or user devices, all of which may connect through a network 114. In some embodiments, the cloud to edge infrastructure 100 further comprises a distributed ledger-based infrastructure (not shown) facilitating the transfer and storage of data necessary to widely distribute the persistent virtual world system 108, including virtual replicas, applications, and any event or interaction within the persistent virtual world system 108. This way, resources including physical servers and network equipment enable a shared storage and computing that may be dynamically allocated depending on factors such as the distance of the user to the resources and the network and computational demand from the users relative to each other and to the locational positions where they are, commanding more or less compute accordingly. In some embodiments, the dynamic allocation of storage and computing is codified into smart contracts using the distributed ledger infrastructure, automatizing the transactional logic (e.g., the computer logic behind each allocation of storage and computing) and the consequences or results of allocation.

According to an embodiment, tracking of devices is performed by one or more of time of arrival (TOA), angle of arrival (AOA), and visual imaging techniques. The tracking may be performed by one or more of radar technology, antennas, Wi-Fi, inertia measuring units, gyroscopes, and accelerometers.

In some embodiments, in order to reduce hardware and network demands, contribute to the reduction of network latency, and improve the general merged reality experience, the system may connect through a network 114 including millimeter-wave (mmW) or combinations of mmW and sub 6 GHz communication systems, such as through $5^{th}$ generation wireless systems communication (5G). In other embodiments, the system may connect through wireless local area networking (Wi-Fi) providing data at 60 GHz. Provided communication systems may allow for low latency and 1-10 Gbps downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

In other embodiments, global navigation satellite systems (GNSS), which refers collectively to multiple satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments of the current disclosure, the system 100 may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

Example applications of the current merged reality system may include the industrial, medical, transportation, entertainment, academic, and resource management (e.g., smart power grids, water management systems,) activities. For example, in a scenario where of a factory robot is commanded to transport materials from one place to another, if a physical visual sensor (e.g., cameras) is either failing or missing in the robot, the robot may use the virtual map of the factory comprising the position of each item in order to detect and accordingly avoid obstacles already located in the persistent virtual world system, such as walls or tables. This capability of using virtual data in order to detect real-world objects may be referred herein as "virtual sensors". In another example, a pizza delivery drone can use the virtual model of the city to find the desired destination and may use the visual sensors only to avoid objects that may not be in the system. In an example of a medical application, a doctor may remotely, in virtual or augmented reality, manipulate a virtual replica of a surgical apparatus that has a real counterpart in a surgical room. Other staff (e.g., doctors, nurses, etc.) may view the virtual avatar of the doctor performing the surgery. In order to increase accuracy, cameras may capture the real patient and the operations room, which may be integrated in the virtual world version displayed to the remote doctor so that he can view in real-time the situation in the operation room. In some embodiments, the virtual replicas may further comprise virtual bots and avatars of users. The virtual bots may be configured to respond as automated agents with human or human-like behavior by employing machine learning algorithms. The virtual bots may or may not be connected to a physical bot in the real world. The human avatars may be configured to display the physical characteristics of the human users or may be configured with a different visual aspect and characteristics.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a non-volatile storage location (e.g., in a server). In this way, virtual replicas, purely virtual objects and applications may interact and collaborate with each other when being configured for accomplishing specific goals even if users are not connected to the server.

Figure 2A:
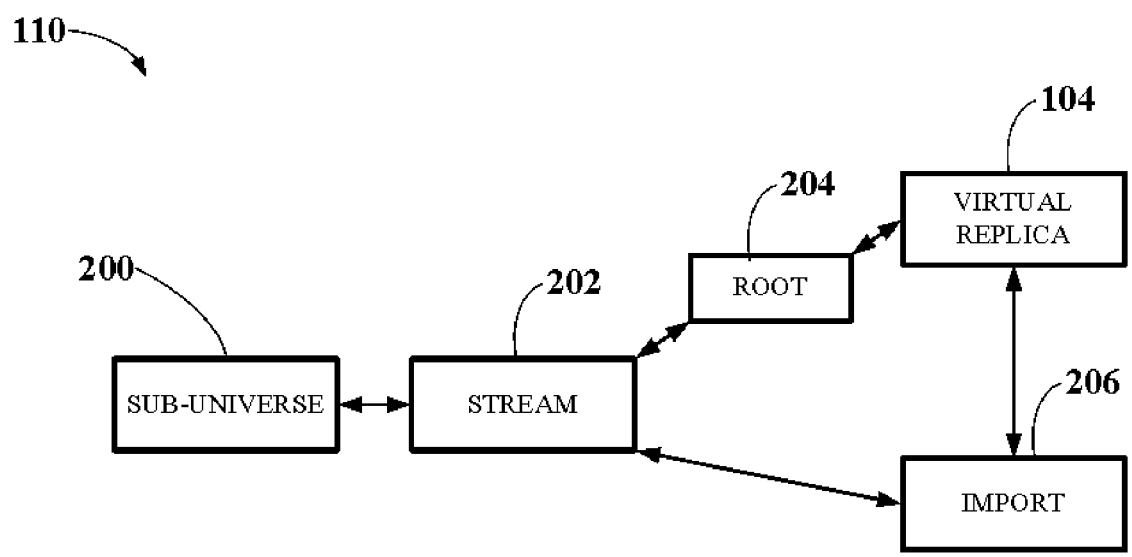
FIGS. 2A-2C depict a diagram of a sub-universe and a network of sub-universes used in a persistent virtual world system, according to an embodiment.
Figure 2B:
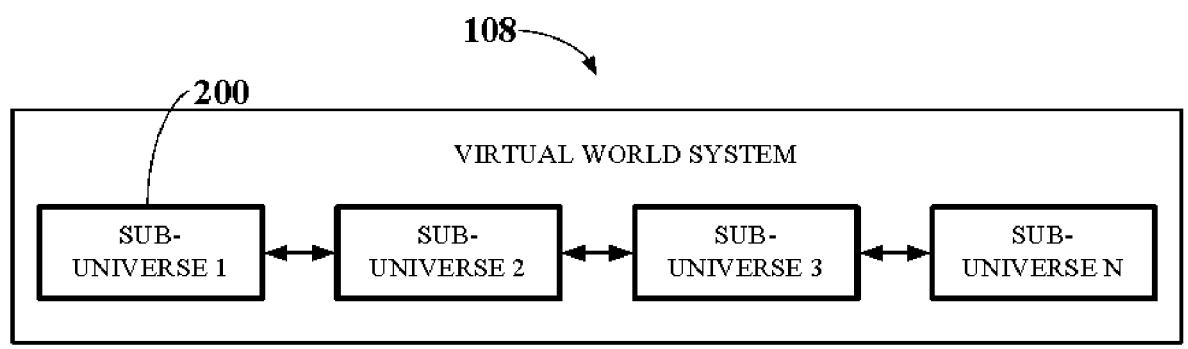
Figure 2C:
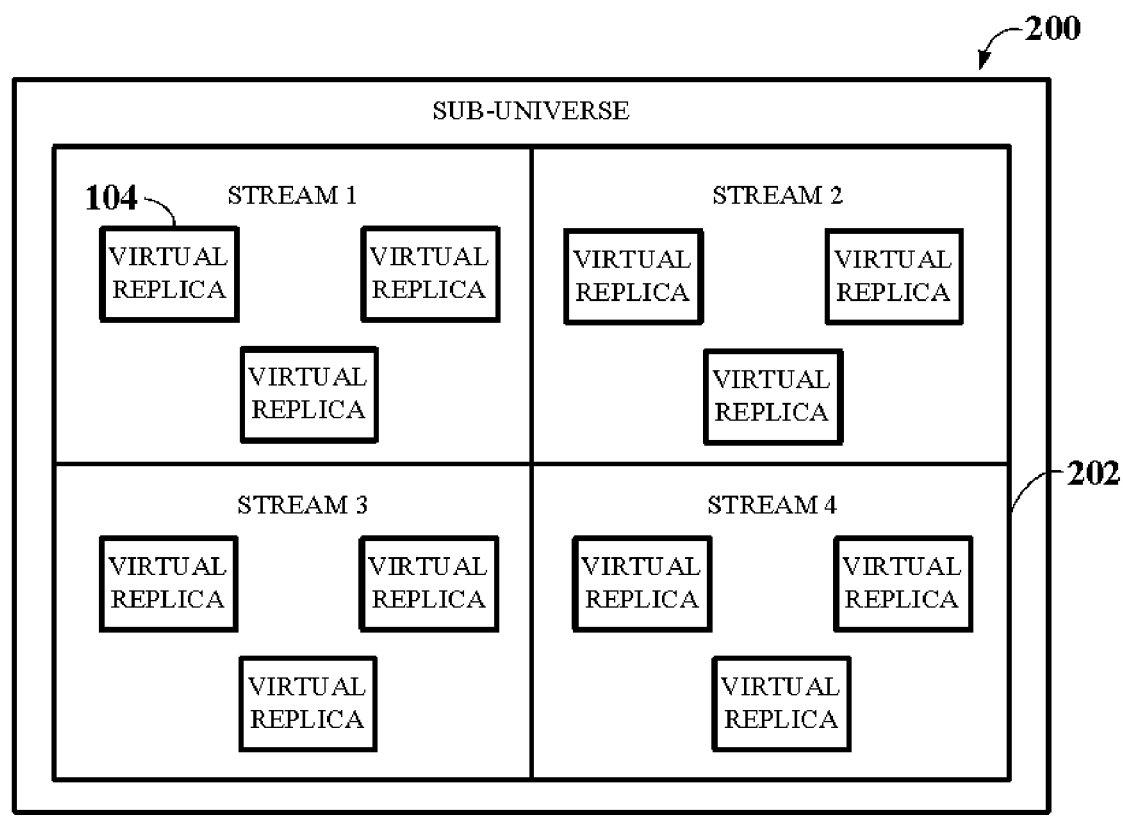

FIGS. 2A-2C depict a diagram of a sub-universe 200 and a network of sub-universes used in a persistent virtual world system 108, according to an embodiment. Some elements of FIGS. 2A-C may refer to similar or the same elements of FIG. 1 and thus may use the same reference numbers.

Making reference to FIG. 2A, a plurality of connected virtual replicas 104 that may be used for goal-specific simulations may constitute a stream 202, wherein each stream 202 is configured to obtain data from the corresponding virtual replicas 104 and to perform goal-specific simulations. Each stream 202 may connect to a root node 204 or root simulation object that spawns a plurality of stream-related virtual replicas 104. The stream 202 may additionally connect to an import function 206 that defines the virtual replicas 104 that the stream 202 needs to perform the required simulations. For example, there may be a traffic stream 202 comprised of a plurality of virtual replicas 104 of vehicles, people, traffic lights, and even weather conditions. In other words, the stream 202 includes any part of the virtual replica network that may be related to the specific function of the stream 202. The import function 206 may define which virtual replicas 104 to consider for the traffic simulation. The stream 202 may then read the behavior of each of the virtual replicas 104 by using a combination of virtual and real sensors and perform goal-specific simulations of traffic scenarios. For example, a goal may be for the traffic stream to be optimized, to run at a pre-determined average speed, or to reduce the chances of car jams. Such simulations may be used, for example, to drive autonomous cars or drones. Another example of a stream 202 may be energy consumption, which may include virtual replicas 104 of buildings including electricity consumption data, and specific energy-consuming virtual replicas 104 such as machines, computers, appliances, etc.

Continuing the description with reference to FIG. 2A, a plurality of streams 202 comprising the totality of virtual replicas 104 in a pre-determined environment forms a sub-universe 200. For example, a city-verse may represent all of the buildings, trees, people, streets, traffic lights, vehicles, etc., of a city. In some embodiments, there may also be a sub-universe within a sub-universe 200, such as a house-verse within a city-verse, which may include the 3D design of the exterior and interior of the house, all of the appliances, people, walls, energy consumption data, etc., of a house.

Making reference to FIG. 2B, a network of sub-universes 200, such as sub-universes 1-4, may form a persistent virtual world system 108. For example, a city-verse may connect to other city-verses to form a country-verse. If the country-verse does not connect to any other sub-universes 200, then the country-verse may represent the universe of the persistent virtual world system 108.

FIG. 2C shows a spatial diagram of a sub-universe 200 comprising a plurality of streams 202, such as streams 1-4, each of which comprises a plurality of stream-related virtual replicas 104.

Figure 3:
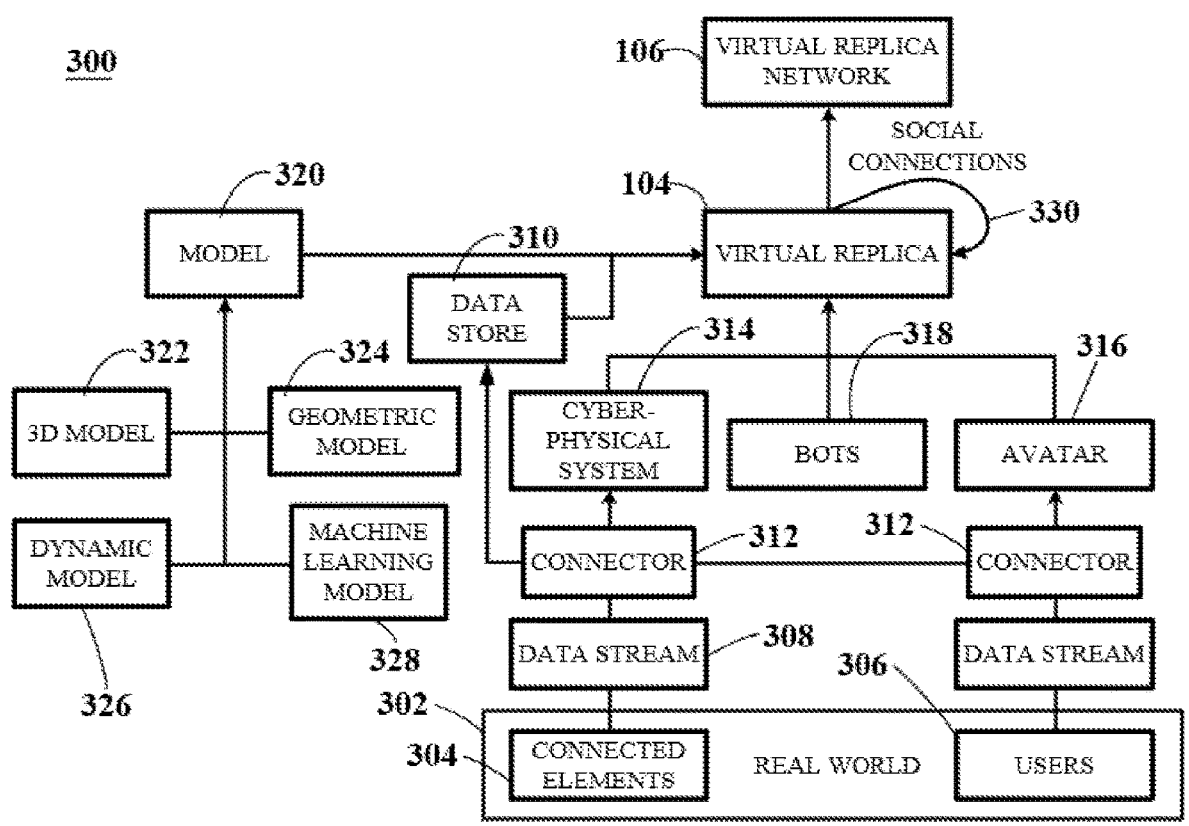
FIG. 3 depicts a diagram describing data and models used to generate a virtual replica network used in a merged reality system, according to an embodiment.

FIG. 3 depicts a diagram of a system 300 describing the design of a virtual replica and the derived virtual replica network used in a merged reality system, according to an embodiment. Some elements of FIG. 3 may refer to similar or the same elements of FIGS. 1-2C and thus may use the same reference numbers.

As viewed in FIG. 3, elements in the real world 302, comprising connected elements 304 and users 306, are connected to the persistent virtual world system through data streams 308. These data streams 308 can be uni-directional or bi-directional depending on the capabilities of the connected elements 304. The persistent virtual world system, as explained with reference to FIG. 1, may be stored in cloud servers 102 and shared in a cloud to edge computing and networking infrastructure 100. In the current disclosure, the term "users" may refer to the humans interacting with the persistent virtual world system or to the devices that may be employed by said humans 306 to interact with applications, such as mobile devices, personal computers, game consoles, media centers, and head-mounted displays, amongst others. In the current disclosure, connected elements 304 refer to technology-based systems that may include communication circuitry (e.g., a network interface) that allows the connected elements to connect and share data to a network excluding user 306 devices, such as surveillance cameras, vehicles, traffic lights, buildings, streets, train-tracks, home appliances, robots, drones and the like.

The data streams 308 sent by connected elements 304 may be obtained by sensors installed on the connected elements 304, such as one or more temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. The data streams 308 of users 306 may comprise, apart from sensor data, user input data resulting from interactions with applications via user devices 306.

By providing a plurality of connected elements 304 and user devices 306 with sensing mechanisms constantly capturing data from the real world 302, the virtual world and each of the synchronized virtual replicas 104 are kept updated with real-time, multi-source data that mirror the conditions of the real world 302. The multi-source data includes capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

Interactions in the persistent virtual world system with the virtual replicas 104 are made through the exchange of data, using publish/subscribe services connected to the data stores 310 of each virtual replica 104. Data types may include periodic and aperiodic, synchronous and asynchronous data. Each virtual replica 104 keeps a data store 310 where the data can be updated by the real twin or by microservices (not shown). Data in the persistent virtual world system can be associated directly to specific virtual replicas 104 or can be processed as anonymous data, which can comprise aggregation of multiple streaming sources of related virtual replicas. For example, data from all the units of a specific model of a car could be processed and aggregated to stream data to be available for predictive maintenance services.

Microservices refer to individual services that can be developed, deployed and maintained independently, each service being configured to perform discrete tasks and communicating with other services through APIs. Each microservice can update data in the data store 310 of the virtual replicas 104 using the virtual replica models and relationships with the environment to modify the value of specific attributes of the virtual replicas 104. Microservices can use specific core services of the persistent virtual world system, such as a plurality of engines, or be connected to external platforms.

The data streams 308 may be stored in the data stores 310 via connectors 312. The connectors 312 may comprise software and hardware used to read data of the data streams 308 and write to the data stores 310. The connectors 312 may use publish/subscribe application programming interfaces (APIs) to connect to the data stores 310 and help to feed the virtual replicas 104 with the data streams 308 from connected elements 304 and user devices 306. The data streams 308 of the connected elements 304 further feed a cyber-physical system 314 through connectors 312, whereas the data streams 308 of user devices 306 feed virtual avatars 316 of the users 306 through connectors 312. System 300 also comprises implementation of bots 318, which may be include hardware and software configured to respond as automated agents with human or human-like behavior by employing machine learning algorithms. The human avatars 316 may be configured to display the physical characteristics of the human users 306, or may be configured with a different visual aspect and characteristics.

In the current disclosure, a pair of virtual-real twin, or twin-pair, can be considered as a cyber-physical system 314, which is an integration of computation with physical processes whose behavior is defined by both cyber and physical parts of the system. Therefore, a virtual replica 104 is the cyber part of the cyber-physical system 314. The virtual replica 104 may then be considered as an extension of the real twin that allows connecting the physical part with artificial intelligence and simulations to improve the capabilities and performance of the object. The virtual replica 104 may, in some embodiments, be a substitute of part of the physical components and processes. For example, in cases when a sensor is failing in the real counterpart the sensing inputs for the real twin are provided by the interactions of the virtual twin in the virtual world. In another example, part of the computation for the real twin could be done in the virtual world if the battery is running low in the real twin.

The virtual replicas 104 may also comprise models 320, which refer to any graphical, mathematical or logical representation of aspects of the reality that may be used to replicate the reality in the persistent virtual world system. In some embodiments, suitable models 320 comprise one or more of a 3D model 322, geometric model 324, dynamic model 326, and machine learning model 328. Although only four models are herein disclosed, it may be understood by those skilled in the art that the system may be adapted to implement fewer or more models than those presented.

The 3D model 322 goes in hand with the geometric model 324 to show data included in each of the geometries of the virtual replica 104, such as textures, colors, shading, reflection, collision effects, and the like. The 3D models 322 comprise the 3D data structure that is used to visually represent the virtual replicas 104 and other virtual elements in the persistent virtual world system, such as applications, ads, virtual bots, etc. The 3D data structure may include, for example, one or more octrees, quadtrees, BSP trees, sparse voxel octrees, 3D arrays, kD trees, point clouds, wireframes, boundary representations (B-Rep), constructive solid geometry trees (CSG Trees), bintrees, and hexagonal structures. The 3D data structure serves the function of accurately and efficiently representing the data of each of the geometries of the virtual objects in the persistent virtual world system. A correct selection of the 3D data structure depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the persistent virtual world system is employed, for example, a higher level of definition may be required for medical or scientific applications than for other types of applications; memory capacities from the servers and from the user devices and thus, desired memory consumption; and others.

The geometric model 324 comprises the mathematical model defining the shape of the virtual replica 104 based on the real-world element and may be complemented by the 3D model 322.

The dynamic model 326 represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model 328 is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real twin through the virtual twin. The machine learning model may employ machine learning algorithms that allow teaching a virtual replica 104 about the behavior of a real twin in order to simulate the behavior of the real twin.

In some embodiments, the models used in the virtual replicas 104 consider the level of detail (LOD) required by a specific scenario computation. LOD involves decreasing the complexity of a model 320 representation as the virtual replica moves away from the viewer, or according to other metrics such as object importance, viewpoint-relative speed, viewer classification, or position. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual replicas, from low to high fidelity models, enabling different simulations to be performed depending on the case and situation LOD management increases the efficiency of computing processes, such as the rendering process by decreasing the workload on graphics pipeline usage, typically vertex transformations, or by enhancing physical simulation, as different 3D models 322 or dynamic models 326 can be associated to the virtual replicas, from low to high fidelity models, so that different simulations can be done depending on the case and situation In general, LOD management may improve framerates and reduce memory and computing demand. LOD management allows also to provide an optimized user experience, depending on the specific requirements and context; for example, a macro-simulation of the traffic in a city can be computed using low-fidelity models, but a micro-simulation using a high-fidelity model may be used to assist the autonomous driving of a vehicle. In another example, the LOD manager may use a low-fidelity model of a medical apparatus for a drone based delivery of the equipment to the hospital while employing a high-fidelity model of the same medical apparatus while a surgeon is performing a surgery in augmented or virtual reality. In some embodiments, LOD is further adjusted to individual viewers, wherein the adjustments comprise considering the LOD of rendering of a specific scene based on whether the viewer is an artificial intelligence viewer or a human viewer. In some embodiments, the LOD is further adjusted depending on a sub-classification of artificial intelligence viewer or of human viewer, wherein each sub-classification defines the quality of LOD required for the specific viewer.

For example, a human such as a doctor or robotics engineer may be sub-classified as a viewer with high-LOD requirements, while a human playing a gaming application in a crowded area may be sub-classified as a viewer with mid-or-low range LOD requirements. In another example, the LOD of a scene of a city can be reduced in detail, and thus in the quality of the image, for a drone utilizing the persistent virtual world system to guide itself when flying in a city to make a delivery. In yet another example, an autonomous vehicle utilizing the persistent virtual world system to guide itself when autonomously driving in a city might use only very high resolution virtual 3D street data, while using a low resolution surrounding data for a vehicle. In another example, the LOD of a scene of a hospital where a surgeon is remotely (e.g., in virtual reality) performing a surgery can be maximized to provide the most amount of details to assist the surgeon during the procedure. Yet in another example, a human user visits touristic attractions that feature very high LOD recreations of specific locations in the persistent virtual world system based on the corresponding real world location, enabling a high-fidelity remote experience of such locations and the touristic attractions therein included. In further another embodiment a command and control center room user may have a birds-eye abstract, white-model false-color view of the persistent virtual world system to monitor the current live activity of the traffic situation.

A plurality of connected virtual replicas 104 forms a virtual replica network 106. Each virtual replica 104 may also display social connections 330 with each other, i.e., interactions amongst each other.

In some embodiments, a virtual replica 104 includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual replicas 104 may be geolocated using a reference coordinate system suitable for use with current geolocation technologies. For example, the virtual replicas may use a World Geodetic System standard such as WGS84, which is the current reference coordinate system used by GPS.

Figure 4:
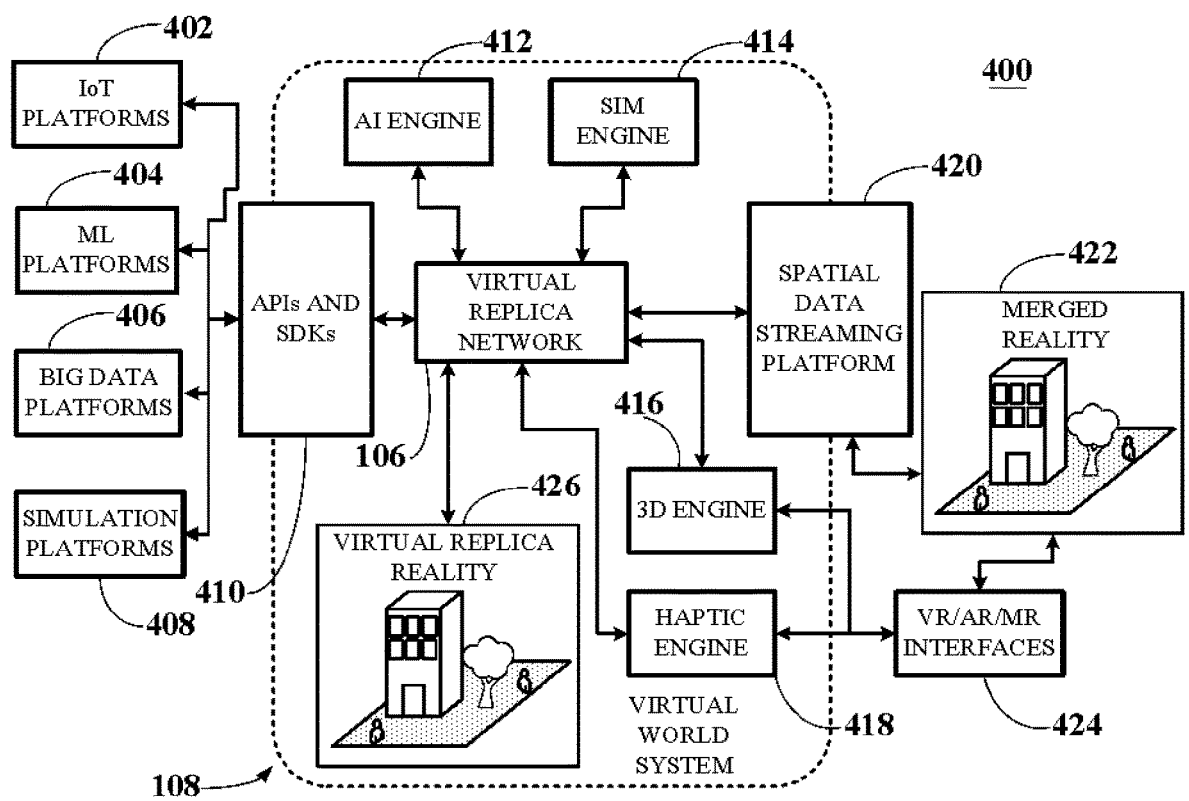
FIG. 4 depicts a diagram describing platforms and interfaces used to generate virtual replica networks used in a merged reality system, according to an embodiment.

FIG. 4 depicts a diagram of a system 400 describing platforms and interfaces used to generate virtual replica networks used in a merged reality system, according to an embodiment. With reference to FIG. 4, the elements located within the dotted lines represent the persistent virtual world system 108 where virtual replicas and virtual replica networks 106 reside.

As viewed in FIG. 4, the virtual replica networks 106 can connect to a plurality of external platforms or to engine services included in the persistent virtual world system 108. The plurality of external platforms may include, for example, an Internet of Things (IoT) platform 402, machine learning (ML) platform 404, big data platform 406, and simulation platform 408, which may connect to the persistent virtual world system 108 through application programming interfaces (APIs) and software development kits (SDKs) 410, in order to provide and manipulate models and consume or publish data to the virtual replicas.

The IoT platforms 402 refers to software and/or hardware that enable the management of multi-source input data received from sensors in connected elements and user devices. The ML platform 404 refers to software and/or hardware that provide the virtual replicas 104 with the capability to use machine learning models and algorithms for artificial intelligence applications. The big data platform 406 refers to software and/or hardware that enables organization in developing, deploying, operating and managing big data related to the virtual replica network 106. The simulation platform 408 refers to software and/or hardware that enable using the virtual replicas and their data and models in order to virtually recreate the real behavior of the real-world entities.

The engine services included in the persistent virtual world system 108 may include an artificial intelligence engine 412, a simulation engine 414, a 3D engine 416, and a haptic engine 418, amongst others. The artificial intelligence engine 412 may include software and/or hardware that enables the management and application of machine learning models and algorithms for artificial intelligence applications. The simulation engine 414 may include software and/or hardware that enable using virtual replicas and their data and models in order to virtually recreate the real behavior of the real-world entities. The 3D engine 416 may include software and/or hardware that may be used in the creation and processing of 3D graphics of the virtual replicas. The haptic engine 418 may include software and/or hardware that enables implementing haptic features to applications and virtual replicas to provide a touch based interaction to the users. The persistent virtual world system also connects to a spatial data streaming platform 420 configured for the optimized exchange and management of real and virtual spatial data in the persistent virtual world system and between the persistent virtual world systems and the merged reality 422.

The 3D engine 416 and haptic engine 418 may connect to the merged reality 422 via suitable digital reality interfaces 424 in user devices, enabling accessing the merged reality in any of virtual reality or augmented reality. The merged reality 422 provides users with an extended reality where real elements are overlapped or augmented by persistent virtual objects, anchored in specific geo-locations or to real elements in the reality, and comprising AI and simulations connected to the virtual replicas of the reality. Users can interact without limitations with this merged reality 422 through his/her avatar 316.

In an embodiment, the virtual replica network 106 is an integral part of the persistent virtual world system 108 and enables an implementation of a virtual replica reality 426, where all real-world elements are completely virtual and may be virtually enhanced (e.g., adding features to the virtual replicas that the real-world elements may not have). In the current disclosure, the virtual replica reality 426 differs from the typical concept of virtual reality, in that virtual reality may represent an immersive realization of the world where all elements are virtual, while the virtual replica reality 426 takes into account the context, accurate geolocation based on the real world objects, and interactions and connections between the virtual replicas, which are kept continuously updated through the data and models input and manipulated via the plurality of platforms and/or engines. Thus, in an embodiment, the virtual replica reality 426 refers to the actual virtual replica of the world within the persistent virtual world system, wherein the persistent virtual world system provides the data, models, interactions, connections and infrastructure enabling the self-computing capabilities and autonomous behavior of each virtual replica.

In yet further embodiments, the system 400 may store in the memory of at least one server separate layers for augmented reality and virtual reality. The separate layers may enable accessing, through the merged reality 422, the virtual replica reality 426 in any of augmented or virtual reality, and may be activated through user devices connected the at least one server whenever accessing one or the other type of reality. Each of the layers may comprise augmentations of reality and virtual replicas that may be specific to each layer. For example, when accessing the merged reality 422 in augmented reality, a user may view the real objects located in the current merged reality scene, the current augmentations of each real object via the corresponding virtual replicas, and the purely virtual objects configured to be visible only in augmented reality. In another example, when viewing the merged reality 422 in virtual reality, the user may only view a version of the virtual replica reality 426 configured for virtual reality, comprising augmentations configured only for the virtual reality view. However, when in virtual reality, users may activate the augmented reality layer in order to view the augmentations and virtual objects originally destined for augmented reality. Likewise, when in augmented reality, users may activate the virtual reality layer in order to be fully transported to virtual reality while still being able to view the augmentations in augmented reality. By way of example, a user may be located in a room where, in augmented reality, the people in the room are identified with a label floating on top of their heads, and where there is a miniature version of a virtual floating planet visible to the all users in the room when viewing in augmented reality. Further in this example, a user may access the room from a remote location in virtual reality and may only view the room virtually, without being able to view any of the augmentations configured for augmented reality. The user may then activate the augmented reality layer, enabling the user to view the name labels and miniature version of the virtual floating planet. The data and models input through the various platforms and/or engines of the persistent virtual world system provide self-computing capabilities and autonomous behavior of virtual replicas, synchronized behavior between the virtual twins and real twins, enhanced capabilities of the real twins through the virtual replicas, and enables employing the data obtained from the real twins to perform simulations and machine learning training and inference in order to perform system optimizations (e.g., traffic or energy consumption optimizations).

"Self-computing capabilities," also referred to as "self-managing capabilities" refers herein to the ability to apply artificial intelligence algorithms in order to autonomously manage computing resources (e.g., distributed computing resources). In an embodiment, virtual replicas with self-computing capabilities in the persistent virtual world system are able to autonomously manage computing resources to adapt to changes in the environment of corresponding real-world elements or in the real-world elements themselves. Self-managing rules and conditions may further be governed through the use of smart contracts running on blockchain or distributed ledger technologies, to further codify the rules and conditions in a distributed and transparent way. Thus, in an embodiment, each virtual replica may exhibit autonomous behavior, acting autonomously depending on the conditions in the real world reflected in the persistent virtual world system (e.g., by allocating required resources, autonomously sending and executing commands and/or generating events as required by each circumstance). Achieving this type of behavior may require training the virtual replicas with artificial intelligence algorithms during the modeling of the virtual replicas. Thus, the role of a virtual replica editor may be limited to defining general policies and rules that guide the self-management process. For example, in the case of a car accident, the virtual replicas of autonomous vehicles close to the accident may decide to lower their speed or come to a stop in order to avoid worsening traffic conditions, and notify the relevant authorities, before the passengers in the vehicle can even know that there was an accident. In this example, the accident history, data, rules and condition handled may be codified per variety of smart contracts defining the consequences and actions of meeting the conditions of such smart contract.

Figure 5A:
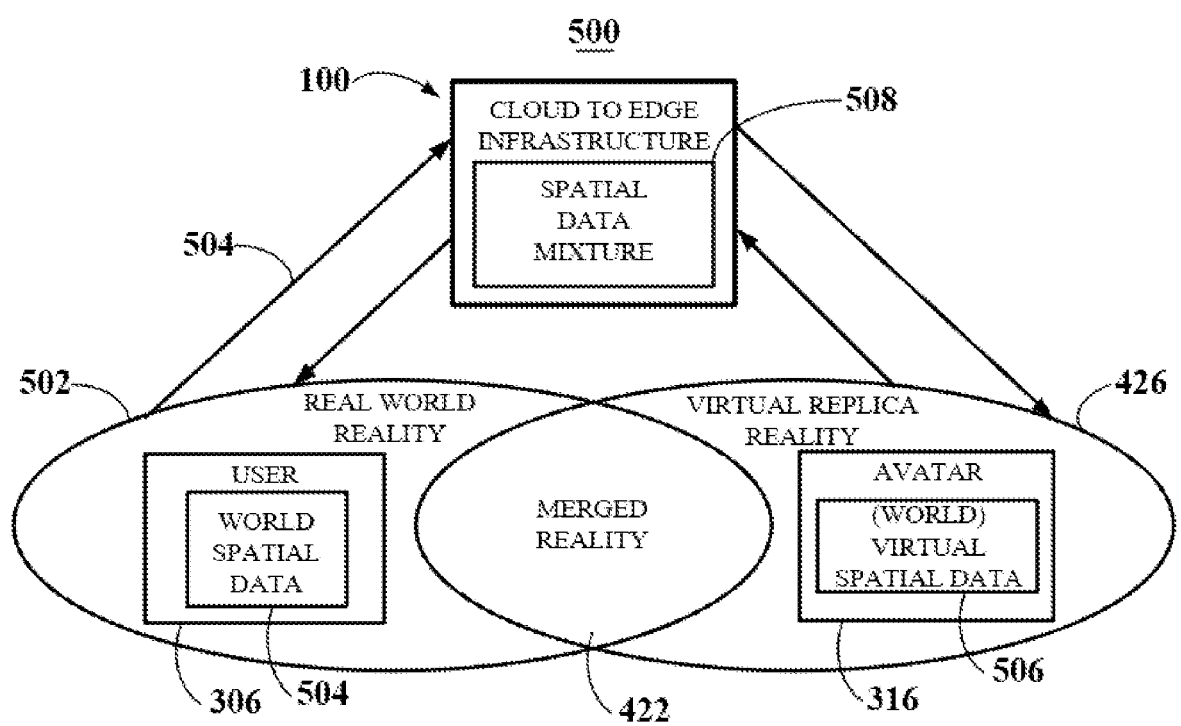
FIGS. 5A-5B depict a diagram a spatial data mixing used in a merged reality system, according to an embodiment.
Figure 5B:
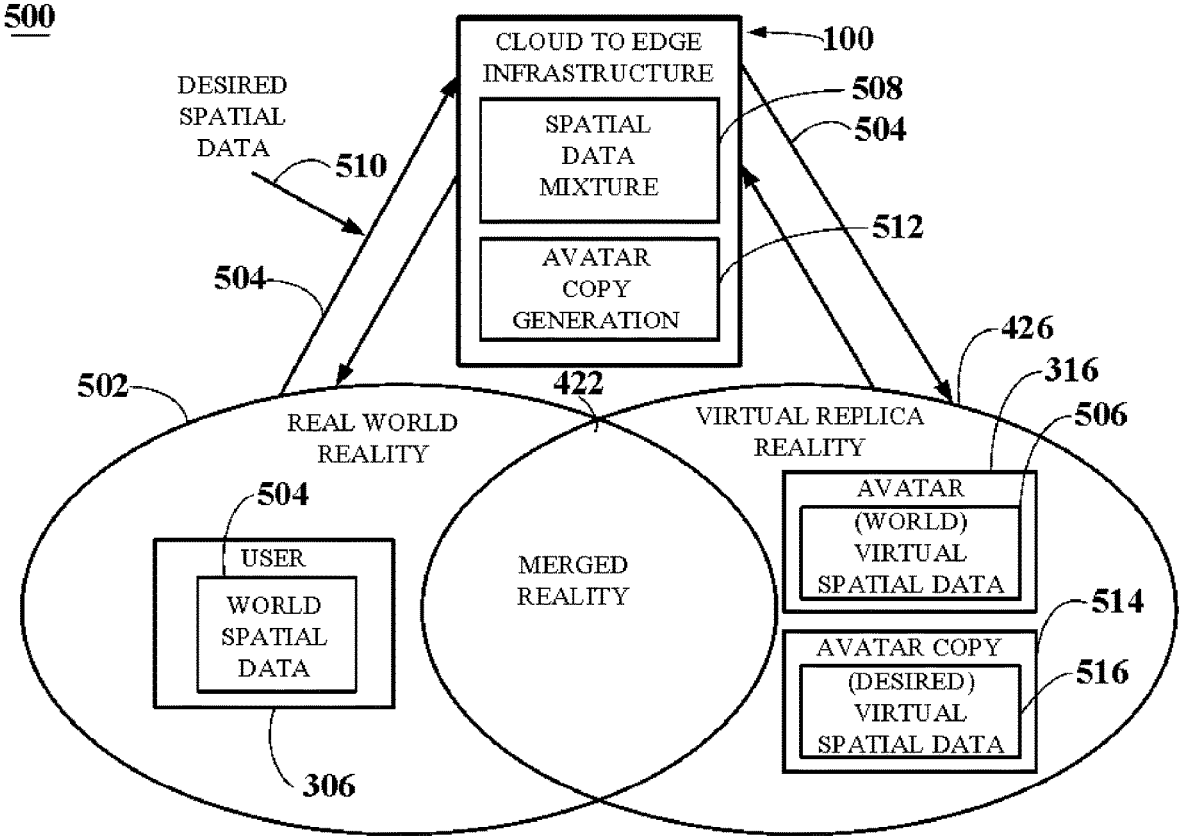

FIGS. 5A-5B depict a diagram a spatial data mixing system 500 used in a merged reality system, according to an embodiment.

Referring to FIG. 5A, the multi-source data obtained from the real-world elements in the real world, or real world reality 502, comprises world spatial data 504 that is transferred to a server for processing. The world spatial data 504 is sent by the servers to the virtual replica reality 426. In this embodiment, the spatial data of the avatar 316 coincides with (e.g., is equal to) the world spatial data 504, and is thus represented in FIG. 5A as (world) virtual spatial data 506.

In some embodiments, the virtual spatial data may also serve to extend the real world reality 502 through a merged reality 422 by a process of spatial data mixing 508 performed by the servers, where users 306 may together view and interact with some elements of real world reality 502 and some elements of virtual replica reality 426. The world spatial data 504 refers herein to instrumentation data captured physically through sensors. The virtual spatial data refers herein to data either input by users 306 manually, through existing computer models of the real-world elements (e.g., BIMs) or inferred by the system from other data, such as through simulations or metadata. Combinations of the world spatial data 504 and the virtually-input spatial data enables augmenting the real spatial data with the virtual spatial data within the merged reality 422.

For example, a scenario of a virtual city may comprise some real-world elements (e.g., dynamic real-world objects) whereupon tracking sensors have been installed or which are tracked by visual means, such as radar imaging, and others (e.g., static real-world objects) where the spatial data has been either manually input or has been inferred by the system. Thus, some objects may comprise a real-time positional tracking, as the spatial data is continuously or periodically being provided by the sensors, while the rest of the data may be virtually input into the system. The spatial data mixing provides users with a smooth view of objects independent of their data being continuously updated through the sensors or virtually.

FIG. 5B shows an embodiment where the user 306 inputs via a user device a desired spatial data 510 (e.g., a desired location), wherein the desired spatial data 510 is different from the world spatial data 504, prompting the processor of the servers within the cloud to edge infrastructure 100 to create a copy of the avatar 316 in the desired location, depicted in FIG. 5B as an avatar copy generation 512. In these embodiments, the user avatar 316 may have a (desired) virtual spatial data 516 in the desired location comprised in an avatar copy 514. The user avatar copy 514 may be viewed by real users physically located in that location or by other virtual users, and may be able to interact with one another. The user avatar copy 514 may also interact with virtual objects in that location, including objects really located in that location or purely virtual objects that do not exist physically. The original user avatar 316 may also be viewed in his real location in merged or virtual reality with, for example, an unavailable status, or may altogether be invisible for other users 306 in that location.

Figure 6:
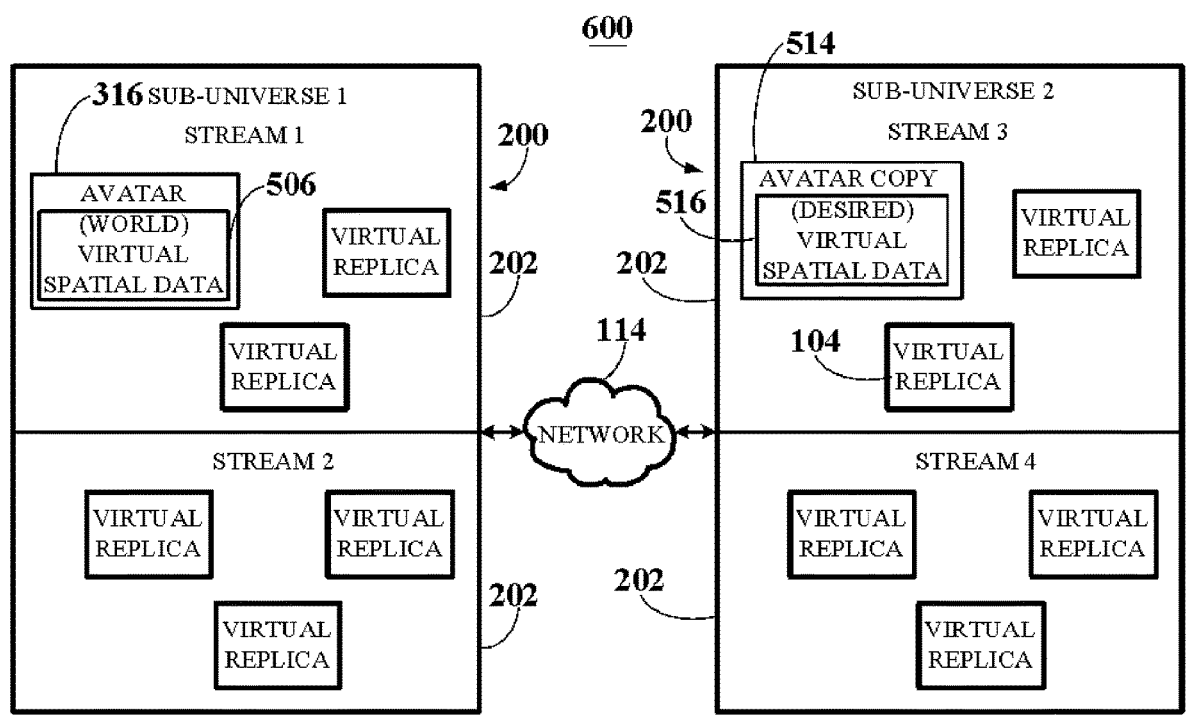
FIG. 6 depicts a spatial diagram of a network of sub-universes showing an avatar real and desired location, according to an embodiment.

FIG. 6 depicts a spatial diagram of a network of sub-universes 600 showing an avatar in a desired location, according to an embodiment.

FIG. 6 shows two sub-universes 200, 1 and 2, where sub-universe 1 comprises two streams 202, streams 1 and 2, and where sub-universe 2 comprises another two streams 202, streams 3 and 4. A user avatar 316 may be located in the real world in a specific location comprising world spatial data in sub-universe 1, stream 1, which is sent to the persistent virtual world system, viewed in FIG. 6 as a (world) virtual spatial data 506.

Meanwhile, the same user avatar 316 may input a desired location in sub-universe 1 stream 1 into the persistent virtual world system, which may generate an avatar copy 514 with a (desired) virtual spatial data 516 that may be viewed by real or virtual users in sub-universe 2 stream 3. The avatar 316 may be viewed in a merged reality or in virtual reality in sub-universe 1, stream 1 with, for example, an "unavailable" status, meaning that the user cannot interact with other users or objects in the original location.

Figure 7:
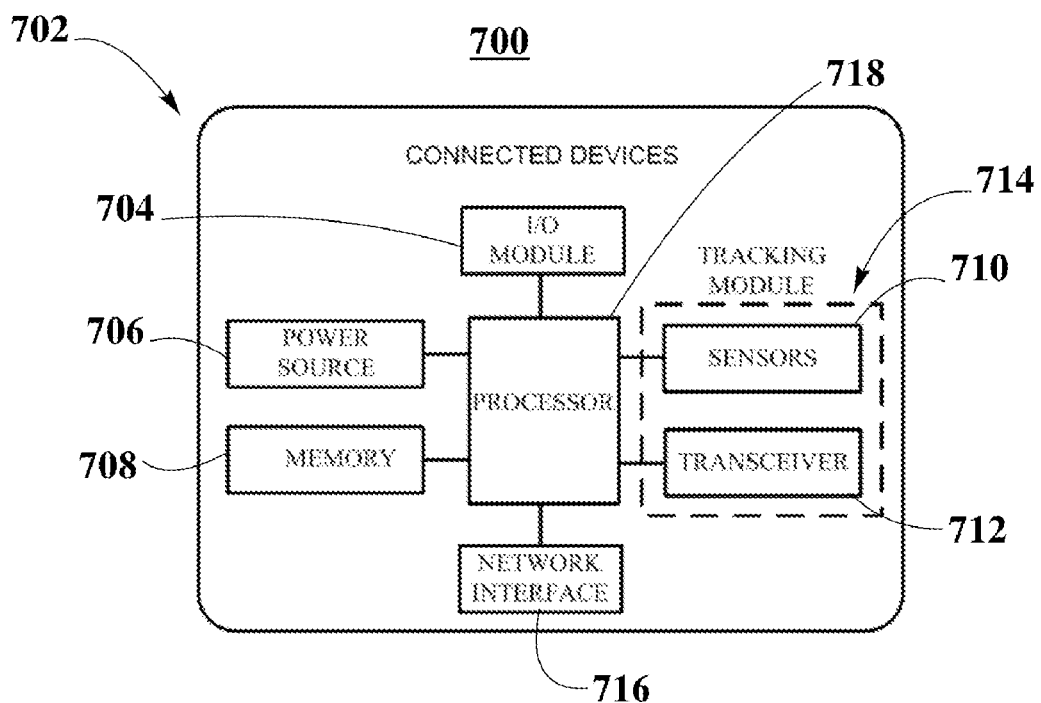
FIG. 7 depicts an operational component diagram of connected devices that may be used in a merged reality system, according to an embodiment.

FIG. 7 depicts an operational component diagram 700 of connected devices that may be used in a merged reality system, according to an embodiment.

A device 702 may include operational components such as an input/output (I/O) module 704; a power source 706; a memory 708; sensing mechanisms 710 and transceivers 712 forming a tracking module 714; and a network interface 716, all operatively connected to a processor 718.

The I/O module 704 is implemented as computing hardware and software configured to interact with users and provide user input data to one or more other system components. For example, I/O module 704 may be configured to interact with users, generate user input data based on the interaction, and provide the user input data to the processor 718 before being transferred to other processing systems via a network, such as to a server. In another example, I/O modules 704 is implemented as an external computing pointing device (e.g., a touch screen, mouse, 3D control, joystick, gamepad, and the like) and/or text entry device (e.g., a keyboard, dictation tool, and the like) configured to interact with other connected elements. In yet other embodiments, I/O module 704 may provide additional, fewer, or different functionality to that described above.

The power source 706 is implemented as computing hardware and software configured to provide power to the device 702. In one embodiment, the power source 706 may be a battery. The power source 706 may be built into the devices or removable from the devices, and may be rechargeable or non-rechargeable. In one embodiment, the devices may be repowered by replacing one power source 706 with another power source 706. In another embodiment, the power source 706 may be recharged by a cable attached to a charging source, such as a universal serial bus ("USB") FireWire, Ethernet, Thunderbolt, or headphone cable, attached to a personal computer. In yet another embodiment, the power source 706 may be recharged by inductive charging, wherein an electromagnetic field is used to transfer energy from an inductive charger to the power source 706 when the two are brought in close proximity, but need not be plugged into one another via a cable. In another embodiment, a docking station may be used to facilitate charging.

The memory 708 may be implemented as computing hardware and software adapted to store application program instructions and to store multi-source data captured by the sensing mechanisms 710. The memory 708 may be of any suitable type capable of storing information accessible by the processor 718, including a computer-readable medium, or other medium that stores data that may be read with the aid of an electronic device, such as a hard-drive, memory card, flash drive, ROM, RAM, DVD or other optical disks, as well as other write-capable and read-only memories. The memory 708 may include temporary storage in addition to persistent storage.

The sensing mechanisms 710 may be implemented as computing hardware and software adapted to obtain data from the real world and determine/track the position and orientation of the device 702 and, therefore, of the one or more real-world elements to which the device 702 may be linked. The sensing mechanisms 710 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 710 include one or more Inertia Measuring Units (IMUs), accelerometers, and gyroscopes. The IMU is configured to measure and report the velocity, acceleration, angular momentum, speed of translation, speed of rotation, and other telemetry metadata of device 702 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 712 may be implemented as computing hardware and software configured to enable devices to receive wireless radio waves from antennas and to send the data back to the antennas. In some embodiments, mmW transceivers 712 may be employed, which may be configured to receive mmW wave signals from antennas and to send the data back to antennas when interacting with immersive content. The transceiver 712 may be a two-way communication transceiver 712.

According to an embodiment, the transceivers 712 enable direct communication between computing devices via a distributed ledger-based communications pipeline connected to a network. The distributed ledger-based communications pipeline may enable direct communication between device 702 through a decentralized network by allowing storage of information in a secure and accurate manner using cryptography, employing cryptographic "keys" and cryptographic signatures. Situations that may require direct communication between device 702, and thus by-passing processing by a server, may include urgent situations in which decisions may need to be taken within a very short period of time. For example, in an autonomous driving case where two vehicles may be about to collide, it may be desired to enable a direct communication between both vehicles to generate a faster response that may prevent a collision. In other embodiments, the distributed ledger may also be utilized between a server and a device 702, where the server may take the authority to validate data before distributing it to each device 702. In further embodiments, the distributed ledger can make use of devices closer to servers, to antennas, or both, in order to assign these device 702 as central structures to validate and distribute data, such by using one or more devices in a cloud to edge infrastructure 100 depicted in FIG. 1.

In an embodiment, the tracking module 714 may be implemented by combining the capabilities of the IMU, accelerometers, and gyroscopes with the positional tracking provided by the transceivers 712 and the accurate tracking, low-latency and high QOS functionalities provided by mmW-based antennas may enable sub-centimeter or sub-millimeter positional and orientational tracking, which may increase accuracy when tracking the real-time position and orientation of device 702. In alternative embodiments, the sensing mechanisms 710 and transceivers 712 may be coupled together in a single tracking module device.

The network interface 716 may be implemented as computing software and hardware to communicatively connect to a network, receive computer readable program instructions from the network sent by the server or by other devices, and forward the instructions for storage in the memory 708 for execution by the processor 718.

The processor 718 may be implemented as computing hardware and software configured to receive and process instructions. For example, the processor 718 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 718 may receive user input data from I/O module 704 and may respectively implement application programs stored in the memory 708. In other examples, the processor 718 may receive multi-source data from sensing mechanisms 710 captured from the real world, or may receive an accurate position and orientation of device 702 through the tracking module 714, and may prepare some of the data before sending the data to a server for further processing.

Figure 8:
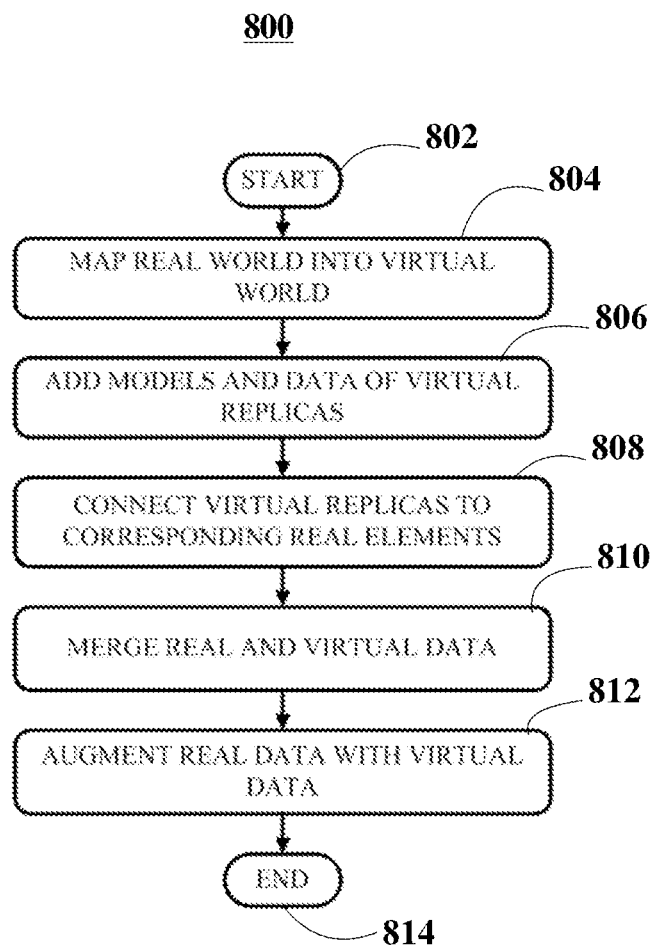
FIG. 8 depicts a method to implement a merged reality system, according to an embodiment.

FIG. 8 depicts a method 800 to implement a merged reality system, according to an embodiment.

The method 800 to implement a merged reality system starts in blocks 802 and 804 by mapping the real world into a virtual world, generating virtual replicas of the real world. The method proceeds in block 806 by adding models and data of the virtual replicas, which may be done via a plurality of engines included in the persistent virtual world system or platforms external to the persistent virtual world system, as described with reference to FIGS. 3 and 4.

The method 800 continues in block 808 by connecting, via a plurality of sensing mechanisms, the virtual replicas to corresponding real elements in order to enrich and synchronize the virtual replicas with data from the real-world elements, and then in block 810 by merging the real and virtual data. Merging the real and virtual data may enable merging realities and further augmenting the real world with virtual data, as viewed in block 812, ending the process in terminator 814.

In the current disclosure, merging the real and virtual data refers to synchronizing the real data with the virtual data in the persistent virtual world system. Through merging the real and virtual data, any event in the real world is reflected in real-time in the virtual world, and any computation that leads to an event in the virtual world is reflected in the real world.

In an embodiment, augmenting the real data with virtual data refers to providing further capabilities to the real world objects via the computations performed in the persistent virtual world system, such through implementation of virtual sensors and wireless power transmission. In another example, augmenting the real data with virtual data may be performed by optimizing the real world objects through the computations in the persistent virtual world system. Other examples of augmenting the real world virtual world data may include providing users with media streams in augmented reality comprising purely virtual objects, or virtual replicas of real objects, or combinations thereof, that may animate a specific scene of the real world. In other examples of the current disclosure, the flight path of a plane or drone can be defined by a virtual tunnel (e.g., a purely virtual object representing a tunnel suspended in the air) so that the plane or drone follows the specified route, preventing crashes with other flying vehicles.

Figure 9:
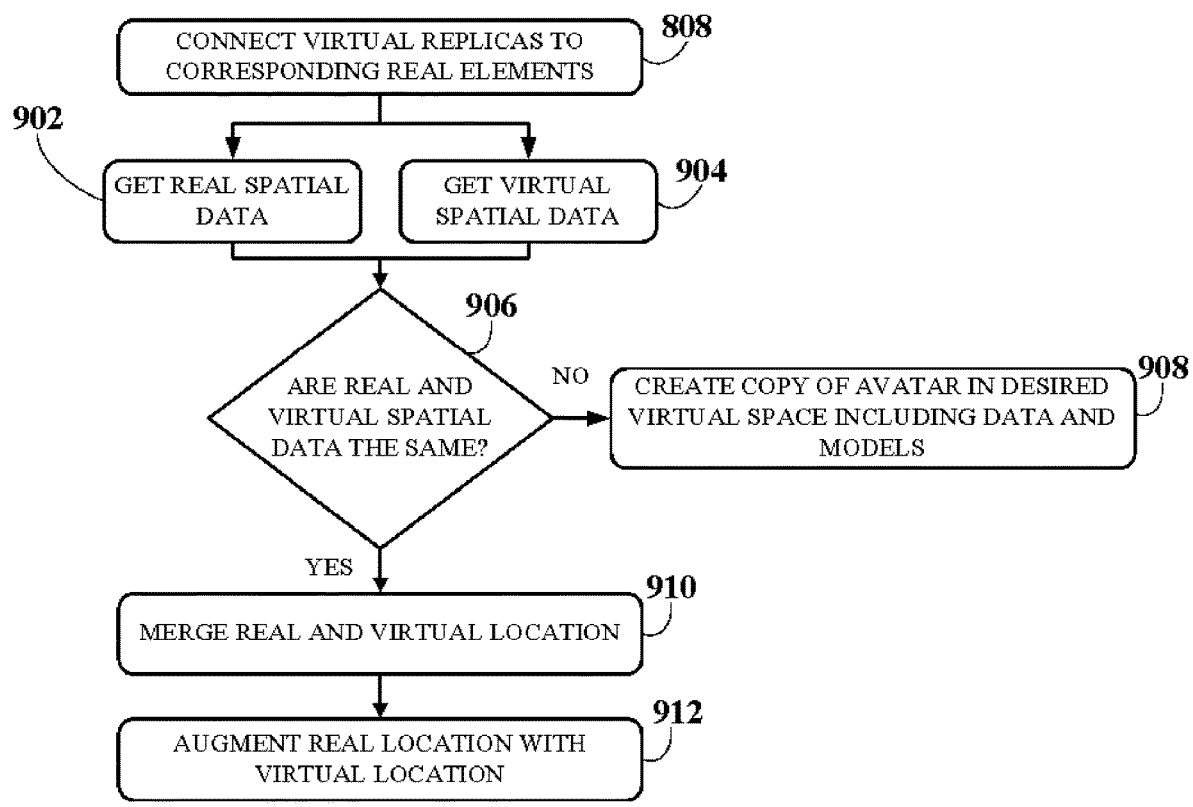
FIG. 9 depicts a method to generate one or more copies of an avatar in one or more distinct locations, according to an embodiment.

FIG. 9 depicts a method 900 to generate one or more copies of an avatar in one or more distinct locations which, according to an embodiment, may enable the avatar to be in more than one location simultaneously. For example, a user in a current location in the real world (referred to as the user's real location) may select for interaction an entity, activity, etc., in a particular virtual location, which may be described as a desired location. The user's real location is represented in real spatial data and maps to a corresponding location in the persistent virtual world system. The desired location is represented in virtual spatial data and also maps to a corresponding location in the persistent virtual world system. If the real spatial data and the virtual spatial data do not coincide, then the corresponding locations are different, and a copy of the user's avatar may be added at the desired location. This can allow the user's avatar to appear to teleport from one virtual location to another or appear in multiple locations at the same time. In this context, the real spatial data and the virtual spatial data are considered to coincide if the real spatial data represents a real location that is the same as, or within a threshold distance of, the desired location. Specific threshold distances can vary based on user preferences, system design, or other factors.

Method 900 begins after connecting and synchronizing the virtual replicas to the real-world elements, depicted in block 808. In blocks 902 and 904 the method 900 proceeds by obtaining real spatial data (representing, e.g., the user's real location) and virtual spatial data (representing, e.g., a desired location), and then by checking whether the real and virtual spatial data coincide, as viewed in block 906. In a negative case, where the real and virtual spatial data do not coincide, the method 900 proceeds in block 908 by creating a copy of a user avatar in the desired location, the copy of the user avatar comprising the original data and models of the user avatar, enabling the copy of the user avatar to interact with other real or virtual users and objects in the desired location. In a positive case, where the real and virtual spatial data coincide, the method 900 continues in block 910 by merging the real and virtual spatial data, finally augmenting the real spatial data with the virtual spatial data, as viewed in block 912.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A merged reality system comprising:
  at least one server comprising at least one processor and memory including a data store storing a persistent virtual world system comprising virtual replicas of real world elements, the virtual replicas comprising virtual data and having self-computing capabilities and autonomous behavior; and
  a plurality of connected devices communicating through a network and comprising sensing mechanisms configured to capture real-world data as multi-source data from real-world elements;
  wherein the real-world data is sent to the persistent virtual world system stored in the server to enrich said virtual replicas and synchronize the virtual replicas with corresponding real-world elements, wherein the at least one server merges the real-world data and the virtual data into the persistent virtual world system in order to augment the real-world data with the virtual data, and wherein the virtual replicas are connected to one another to create a virtual replica network.

2. The system of claim 1, wherein the virtual replicas include logic and models input through a plurality of software platforms and software engines, and wherein the plurality of software platforms comprise Internet of Things platforms, machine learning platforms, big data platforms, simulation platforms, or spatial data streaming platforms, or a combination thereof, and wherein the plurality of software engines comprise artificial intelligence engines, simulation engines, 3D engines, or haptic engines, or a combination thereof.

3. The system of claim 2, wherein the models comprise one or more of a 3D model, a dynamic model, a geometric model, or a machine learning model, or a combination thereof.

4. The system of claim 3, wherein the 3D model comprises a 3D data structure representing at least one 3D object, the 3D data structure comprising quadtrees, BSP trees, sparse voxel octrees, 3D arrays, kD trees, point clouds, wire-frames, boundary representations (B-Rep), constructive solid geometry trees (CSG Trees), bintrees, or hexagonal structures, or combinations thereof.

5. The system of claim 3, wherein the machine learning model employs machine learning algorithms based on actual or simulated data that have been used as training data.

6. The system of claim 2, wherein the models consider a level of detail required by a specific scenario computation, wherein the level of detail adjusts complexity of a model representation depending on distance of the virtual replica from a viewer, object importance, viewpoint-relative speed or position, classification of individual viewers, or combinations thereof.

7. The system of claim 6, wherein the classification of individual viewers comprises artificial intelligence viewers or human viewers, and wherein the level of detail is further adjusted depending on a sub-classification of artificial intelligence viewer or of human viewer.

8. The system of claim 1, wherein the real-world data comprises real spatial data and the virtual data comprises virtual spatial data, and wherein combinations thereof by the at least one server enable augmenting the real spatial data with the virtual spatial data.

9. The system of claim 8, wherein the virtual spatial data represents a desired location input by a user via a user device, the desired location being different from a real location of the user, prompting the processor to create a copy of an avatar of the user in the desired location.

10. The system of claim 1, wherein each of the connected virtual replicas is included in one or more streams representing a goal-specific simulation configured to obtain data from corresponding virtual replicas.

11. The system of claim 10, wherein the one or more streams form a sub-universe, the sub-universe representing a defined virtualized space of a persistent virtual world system.

12. The system of claim 1, wherein the system employs a cloud to edge distributed computing infrastructure.

13. A method to generate a merged reality system, the method comprising:
mapping real world objects into a virtual world, by generating virtual replicas of the real world objects;
adding models and real-world data related to the real world objects to the virtual replicas, thereby providing self-computing capabilities and autonomous behavior to the virtual replicas;
merging the real-world data and virtual data;
augmenting the real-world data with the virtual data; and
connecting the virtual replicas to one another to create a virtual replica network.

14. The method of claim 13, further comprising:
obtaining real spatial data and virtual spatial data;
checking whether the real and virtual spatial data coincide;
where the real spatial data and virtual spatial data do not coincide, creating a copy of a user avatar in a desired location;
where the real spatial data and virtual spatial data coincide, merging the real and virtual spatial data; and
augmenting the real spatial data with the virtual spatial data.

15. The method of claim 13, wherein each of the connected virtual replicas is included in one or more streams representing a goal-specific simulation configured to obtain data from corresponding virtual replicas.

16. The method of claim 15, wherein the one or more streams form a sub-universe, the sub-universe representing a defined virtualized space of a persistent virtual world system.

17. One or more non-transitory computer readable-media having stored thereon instructions configured to cause a computer system comprising memory and at least one processor to perform steps comprising:
mapping real world objects into a virtual world by generating virtual replicas of the real world objects in the virtual world;
adding models and real-world data related to the real world objects to the virtual replicas, thereby providing self-computing capabilities and autonomous behavior to the virtual replicas;
merging the real-world data and virtual data;
augmenting the real-world data with the virtual data; and
connecting the virtual replicas to one another to create a virtual replica network.

18. The computer readable medium of claim 17, further comprising:
obtaining real spatial data corresponding to a real location and virtual spatial data corresponding to a desired location in the virtual world;
checking whether the real and virtual spatial data coincide;
where the real spatial data and virtual spatial data do not coincide, creating a copy of a user avatar in the desired location;
where the real spatial data and virtual spatial data coincide, merging the real and virtual spatial data; and
augmenting the real spatial data with the virtual spatial data.

19. The computer readable medium of claim 17, wherein each of the connected virtual replicas is included in one or more streams representing a goal-specific simulation configured to obtain data from corresponding virtual replicas.

20. The computer readable medium of claim 19, wherein the one or more streams form a sub-universe, the sub-universe representing a defined virtualized space of a persistent virtual world system.

* * * * *